United States Patent
Ganesan et al.

(10) Patent No.: US 9,313,512 B2
(45) Date of Patent: Apr. 12, 2016

(54) MULTIPLE BIT RATE ENCODING BY SEGMENTS

(75) Inventors: Prasanna Ganesan, Union City, CA (US); Sumankar Shankar, Alwarpet (IN); Ananth Rao, Mountain View, CA (US)

(73) Assignee: Vudu, Inc., Sunnyvale, CA (US)

( * ) Notice: Subject to any disclaimer, the term of this patent is extended or adjusted under 35 U.S.C. 154(b) by 961 days.

(21) Appl. No.: 12/952,133

(22) Filed: Nov. 22, 2010

(65) Prior Publication Data

US 2011/0122939 A1  May 26, 2011

Related U.S. Application Data

(60) Provisional application No. 61/264,653, filed on Nov. 25, 2009.

(51) Int. Cl.
| | |
|---|---|
| *H04N 19/194* | (2014.01) |
| *H04N 19/115* | (2014.01) |
| *H04N 19/61* | (2014.01) |
| *H04N 19/152* | (2014.01) |
| *H04N 19/164* | (2014.01) |
| *H04N 19/177* | (2014.01) |

(52) U.S. Cl.
CPC .......... *H04N 19/194* (2014.11); *H04N 19/115* (2014.11); *H04N 19/152* (2014.11); *H04N 19/164* (2014.11); *H04N 19/177* (2014.11); *H04N 19/61* (2014.11)

(58) Field of Classification Search
CPC .......... H04N 19/0006; H04N 19/00193; H04N 19/00236; H04N 19/00284; H04N 19/00363; H04N 19/00781; H04N 19/115; H04N 19/152; H04N 19/164; H04N 19/177; H04N 19/194; H04N 19/61
USPC ........................ 375/E7.026, 240.01
See application file for complete search history.

(56) References Cited

U.S. PATENT DOCUMENTS

| | | | | |
|---|---|---|---|---|
| 5,535,216 | A   * | 7/1996  | Goldman et al. | 370/503 |
| 6,959,044 | B1 * | 10/2005 | Jin et al. | 375/240.12 |
| 2003/0206558 | A1 * | 11/2003 | Parkkinen et al. | 370/477 |
| 2004/0081198 | A1 * | 4/2004  | Gardner et al. | 370/468 |
| 2006/0026295 | A1 * | 2/2006  | Iwamura | 709/233 |
| 2008/0293494 | A1 * | 11/2008 | Adiraju et al. | 463/42 |
| 2009/0307368 | A1 * | 12/2009 | Sriram et al. | 709/231 |
| 2010/0135636 | A1 * | 6/2010  | Zhang et al. | 386/68 |

* cited by examiner

*Primary Examiner* — Mohammed Rahaman
(74) *Attorney, Agent, or Firm* — Bryan Cave LLP

(57) ABSTRACT

A method performed by one or more processors for segmenting and encoding media content over a network. The media content is first partitioned into an ordered sequence of media segments. Each of the media segments is then encoded (i) at a first bit rate to generate a respective one of a first set of data segments, and (ii) at a second bit rate to generate a respective one of a second set of data segments, wherein data segments of the first set may be used interchangeably with data segments of the second set to facilitate continuous playback of the media content. A request for the media content is then received from another device in the network. In response, a respective one of the first set of data segments or the second set of data segments is selectively transmitted, for each of the media segments, based at least in part on a network bandwidth of the first device.

18 Claims, 5 Drawing Sheets

MULTIPLE BIT RATE ENCODING BY SEGMENTS

RELATED APPLICATIONS

This application claims benefit of priority to provisional U.S. Patent Application No. 61/264,653, filed Nov. 25, 2009; the aforementioned priority application being hereby incorporated by reference in its entirety.

TECHNICAL FIELD

The present invention relates generally to the encoding of media content, and specifically to encoding segments of a media content at multiple bit rates.

BACKGROUND OF RELATED ART

Streaming media content typically involves encoding the media content (e.g., video and/or audio) into a data format which may be easily transferred (or "streamed") over a network, from one device to another. The goal of streaming media content is to provide a receiving device with a steady stream of data to ensure constant and continuous playback of the desired media content, without excessive buffering (i.e., pre-storing of the content data). Thus, the quality of the media content being played back depends on both the reliability of the bandwidth of the receiving device, as well as the size of the data stream.

For example, media content that is encoded at a very low bit rate may be played back uninterruptedly even if the receiving device has a relatively low bandwidth connection to the network, although the sound and/or picture quality of the media content may suffer. On the other hand, a receiving device may need to be connected at a much higher bandwidth for uninterrupted playback of media content that is encoded at a relatively high bit rate. Media content that is encoded at a higher bit rate may offer superior sound and/or picture quality, however, there may be slight pauses (e.g., to buffer the received data) during playback of the media content if the receiving device is not connected at a high enough bandwidth.

A problem with shared Ethernet connections is that the bandwidth associated with any individual device often fluctuates. Because the bandwidth associated with a receiving device can be unpredictable at any given time, it is difficult to create an "optimized" stream of media content by encoding at just a single fixed bit rate.

Thus, there is a need for encoding and streaming media content over a network by adjusting the quality of the sound and/or picture quality to account for fluctuations in the bandwidth associated with a receiving device, without interrupting a playback of the media content on the receiving device.

BRIEF DESCRIPTION OF THE DRAWINGS

The present embodiments are illustrated by way of example and not intended to be limited by the figures of the accompanying drawings, where.

DETAILED DESCRIPTION

Figure 1:
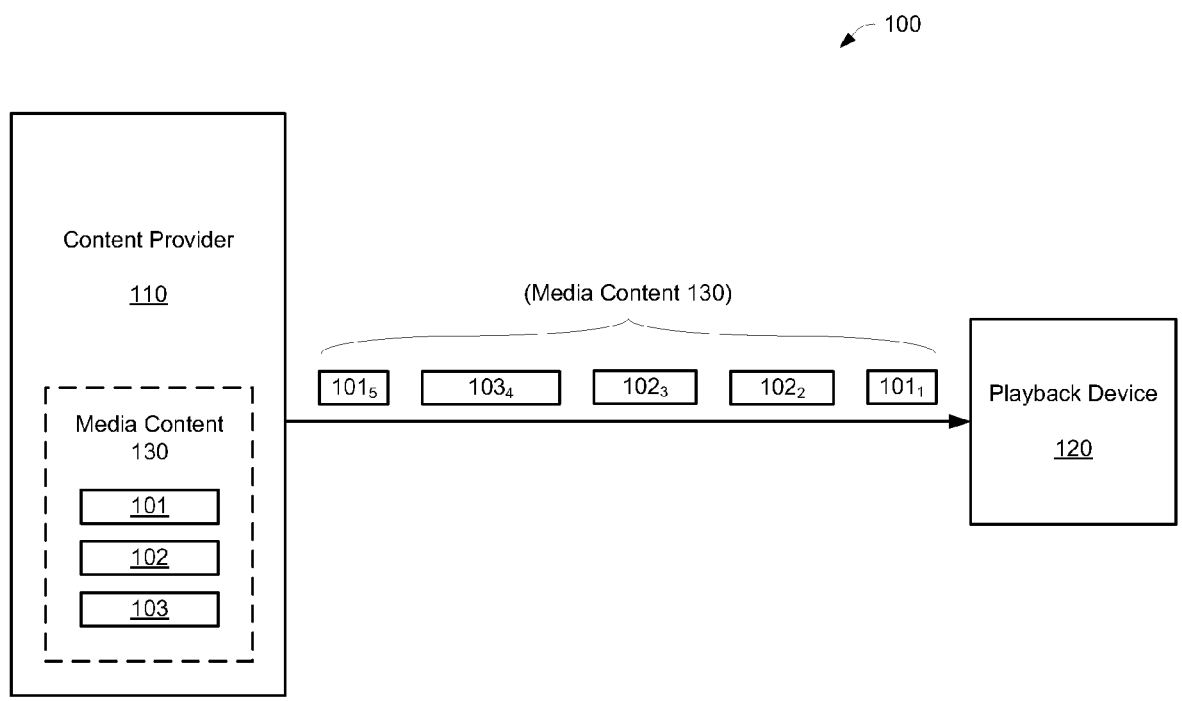
FIG. 1 illustrates a system for streaming multiple bit rate encoded media content, according to an embodiment.

A method and apparatus for encoding and streaming media content to account for fluctuations in bandwidth are disclosed. In the following description, for purposes of explanation, specific nomenclature is set forth to provide a thorough understanding of the present invention. However, it will be apparent to one skilled in the art that these specific details may not be required to practice the present invention. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be a single signal line, and each of the single signal lines may alternatively be a bus. Accordingly, the present invention is not to be construed as limited to specific examples described herein but rather includes within its scope all embodiments defined by the appended claims.

Embodiments described herein allow for the sound and/or video quality of streaming media content to be automatically adjusted in response to changes in a receiving device's connection bandwidth. Certain embodiments provide a method of encoding multiple copies of the media content at different bit rates, respectively, such that the bit rate of the corresponding data provided to the receiving device depends on the bandwidth associated with the receiving device. Further embodiments provide a method of segmenting each of the encoded copies of the media content such that corresponding segments (i.e., that are encoded at different bit rates) are interchangeable with one another.

In the context of this application, the term "bandwidth" is intended to mean a rate at which a device can download or receive data from a source. "Bit rate" is a minimum or required bandwidth for adequately playing a particular data stream (e.g. without interruption). The "size" of the data stream may be quantified by the number of bytes in the data stream, while the "duration" refers to the playing time of the data stream.

For some embodiments, the receiving device includes circuitry to monitor its own connection bandwidth and thus request media content segments of the appropriate bit rate(s). The receiving device may include a playback buffer to temporarily store media content segments as they are received from a content provider and thus queue the segments for playback. For certain embodiments, the receiving device may monitor the capacity (or "fullness") of the playback buffer in order to determine at what bit rate subsequent media content segments should be retrieved. Accordingly, the fullness of the playback buffer at any given time may indicate the connection bandwidth associated with the receiving device at that time.

In the following description, specific reference is made to a receiving device. However, it should be noted that a receiving device may be any network-connected device capable of receiving and/or playing back media content (or "streaming") data. Thus, for purposes of discussion, the terms "receiving device" and "playback device" may be used herein interchangeably. In addition, a content provider refers to any network-connected device capable of transmitting or streaming media content to another device connected to the network. Accordingly, the terms "content provider," "server," and/or "host device" may be used herein interchangeably.

FIG. 1 illustrates a system 100 for streaming multiple bit rate encoded media content, according to an embodiment. The system 100 includes a content provider 110 and a playback device 120. The playback device 120 is communicatively coupled to the content provider 110 via a network infrastructure (not shown for simplicity). The content provider 110 is configured to store media content 130, which may correspond to audio and/or video data which may be transmitted (or streamed) to the playback device 120 and subsequently played back thereon. Although only one media content 130 is shown for purposes of discussion, the content provider 110 may store a plurality of media content available for download by the playback device 120.

For some embodiments, the content provider 110 stores multiple data files 101-103 pertaining to the media content 130. Each of the data files 101-103 corresponds to a copy of the media content 130 encoded at a different bit rate, respectively, and each of which may be used individually to playback the media content 130 in its entirety. For example, the data file 101 may correspond to the entire media content 130 encoded at a low bit rate; the data file 102 may correspond to the entire media content 130 encoded at a middle bit rate; and the data file 103 may correspond to the entire media content 130 encoded at a high bit rate. Although not shown, for simplicity, each of the data files 101-103 may be further broken down into a number of sequential (or "ordered") segments each corresponding to a respective length (i.e., portion) of the media content 130 (as will be described in greater detail below).

Upon receiving a request for the media content 130 from the playback device 120, the content provider 110 begins transmitting media content segments (e.g., $101_1$, $102_2$, $102_3$, etc.) to the playback device 120. The bit rate of each transmitted segment $Z_n$ (where Z denotes the data file 101-103 from which the $n^{th}$ segment of the media content 130 is transmitted) depends on the bandwidth available to the playback device 120. For example, if the connection bandwidth of the playback device 120 is relatively high for a given interval of time, the content provider 110 may transmit media content segments that are encoded at the high bit rate (e.g., $103_n$). In contrast, if and/or when the bandwidth available to the playback device 120 drops below a certain threshold, the content provider 110 may transmit media content segments that are encoded at a lower bit rate (e.g., $102_n$ or $101_n$).

In the specific example shown, the content provider 110 begins by transmitting the first segment of the media content 130 at the lowest bit rate (e.g., $101_1$). Upon determining that a higher bandwidth is available to the playback device 120, the content provider 110 transmits the next two (i.e., second and third) segments of the media content 130 at the middle bit rate (e.g., $102_2$ and $102_3$). After determining that even more bandwidth is available to the playback device 120, the content provider 110 transmits the following (i.e. fourth) segment of the media content 130 at the highest bit rate (e.g., $103_4$). Then, upon detecting a sudden drop in the bandwidth of the playback device 120, the content provider 110 responds accordingly by transmitting the fifth segment of the media content 130 at the lowest bit rate (e.g., $101_5$). It should be noted that, depending on how steep (or little) the drop in bandwidth, the content provider may alternatively transmit the fifth segment of the media content 130 at the middle bit rate (e.g., $102_5$).

For some embodiments, in response to an initial request for the media content 130, the content provider 110 is configured to always begin transmitting or streaming media content segments encoded at the lowest bit rate (e.g., $101_n$). This is to ensure that the least amount of buffering (i.e., by the playback device 120) is necessary to begin playing back the media content 130. Such a configuration may be advantageous, since it is also unlikely that the connection bandwidth of the playback device 120 will be determined by the time the initial request is received. For other embodiments, the playback device 120 may monitor its own bandwidth and thus request each media content segment individually depending on its available bandwidth at the time.

Although the content provider 110 is shown here as a single functional block, it may in fact comprise of many internet-worked devices. For example, the content provider 110 may include a server to receive and process requests from the playback device 120, and then provide authentication information to enable the playback device 120 to retrieve the media content 130 from one or more host devices on the network. This may reduce the overhead to the content provider 110 as well as any bottlenecks which may result from the content provider 110 having to process multiple requests and stream media content to a number of different devices connected to the network.

Furthermore, it should be noted that in the exemplary embodiments herein, the media content 130 is shown as being encoded at three different bit rates (i.e., data files 101-103). However, the number of copies (and respective bit rates) made for each media content may in fact be greater than or fewer than those shown. For example, by producing more data files (or copies) of the media content 130, the content provider 110 may transmit media content segments that are more "optimized" to (i.e., which better utilize) the available bandwidth of the playback device 120. On the other hand, the number of data files produced for each of the media content may be limited by the amount of storage space available on the content provider 110.

Figure 2A:
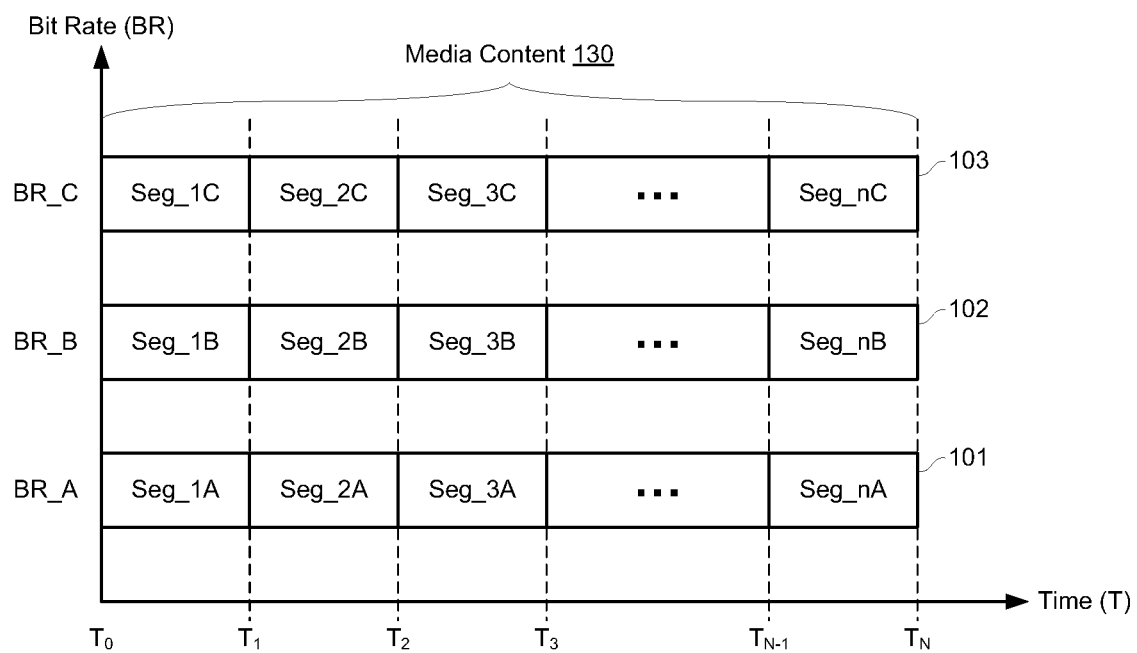
FIGS. 2A and 2B illustrate an encoding of media content segments, according to an embodiment.
Figure 2B:
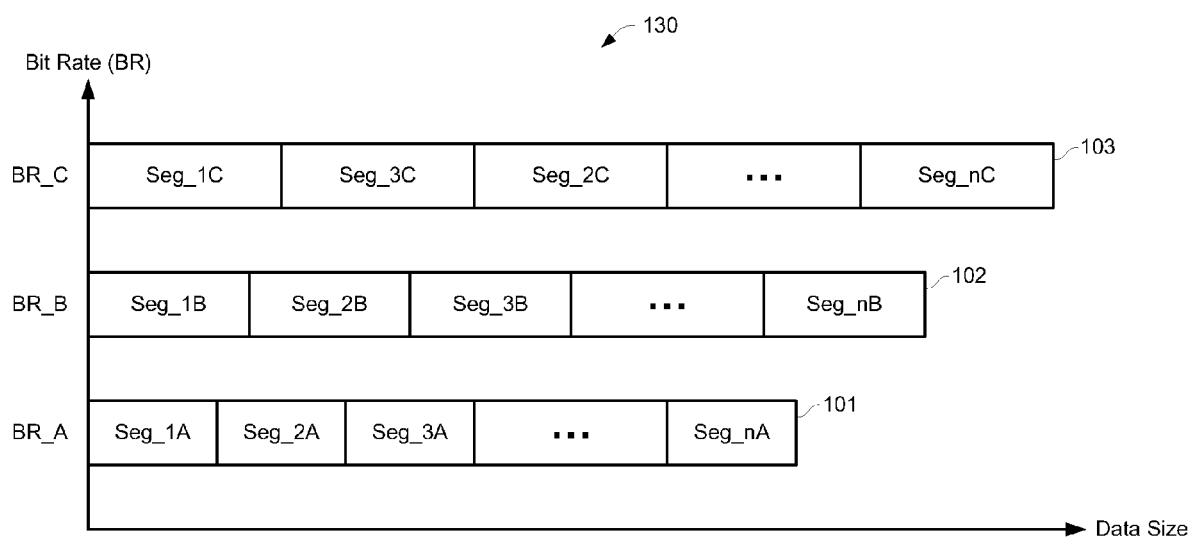

FIGS. 2A and 2B illustrate an encoding of media content segments, according to an embodiment. Each of the data files 101-103 may be used separately or interchangeably to play back the media content 130. For example, a user may play back the entire media content 130 (i.e., from $T_0$-$T_N$) using only (segments of) the data file 101. Alternatively, the media content 130 may be played back using a combination of media content segments from two or more of the data files 101-103.

As shown in FIGS. 2A and 2B, the data file 101 is encoded at the lowest bit rate BR_A; the data file 102 is encoded at a higher bit rate BR_B; and the data file 103 is encoded at the highest bit rate BR_C. Each of the data files 101-103 is further divided into n number of segments. For example, data file 101 includes media content segments Seg_1A-Seg_nA; data file 102 includes media content segments Seg_1B-Seg_nB; and data file 103 includes media content segments Seg_1C-Seg_nC.

For some embodiments, corresponding segments of each of the data files 101-103 are identical (or at least substantially similar) in length. As shown in FIG. 2A, the length of the first segment of each of the data files 101-103 (i.e., Seg_1A, Seg_1B, and Seg_1C) corresponds to the duration $T_0$ to $T_1$ (e.g., the first minute of playback of the media content 130). Accordingly, media content segments of any one of the data files 101-103 may be combined (or interchanged) with one or more segments of any of the other data files 101-103, such that like-numbered segments among the data files 101-103 are substituted for one another.

By pre-encoding each of the data files 101-103 to have corresponding segment boundaries, a receiving device may simply concatenate the n received media content segments (i.e., regardless of bit rate) to achieve continuous playback of the media content 130. In other words, since the segment boundaries within each of the data files 101-103 are coincidental, consecutive media content segments from different data files (e.g., Seg_1A and Seg_2C) may be played back smoothly with little or no noticeable change (or "hiccup") in the continuity of playback of the media content 130.

In one embodiment, the data files 101-103 can be encoded such that the sequence of group of pictures (GOP) lengths is identical across different bit rates. The video in the data files may be encoded, for example, using the H.264 standard.

Data files can be encoded to ensure that GOP lengths match across bit rates by varied means. In one embodiment, fixed GOP lengths are used. In another embodiment, one of many multi-pass modes, available with different encoders, is used. In the first (or other preliminary) pass, encoders can analyze a given video stream and output video statistics in addition to the encoded video. Many video encoders use scene cut detection heuristics to determine GOP lengths in the preliminary passes, and are often configured to output this information in the outputted video statistics. By sharing one set of analyzed video statistics information in encoding the second (or final) pass of a given video at various bit rates, an identical sequence of GOP lengths in all outputted bit rates can be achieved.

Typically, to obtain good results, the target bit rate and/or other qualities of all passes should be similar. Because the data files are encoded at a variety of bit rates, a target bit rate for the first (or preliminary) passes must be chosen. In one embodiment, the median of the set of final target bit rates (e.g., the second highest bit rate of three different bit rates) is chosen as the target bit rate for encoding a data file in the first pass. In another embodiment, an expected target quality can be chosen to encode a data file in the first pass.

As discussed previously, the encoded data files are divided into a number of segments. When a playback device requests a media content from the content provider, the content provider begins streaming media content segments to the playback device. In one embodiment, the media content segments are streamed according to the MPEG standard. The MPEG transport stream has some syntactic elements that may change when these segments are concatenated. In some embodiments, the discontinuity indicator in the adaptation field of transport packets is set to indicate the occurrence of discontinuities when the segments are concatenated.

In other embodiments, discontinuity indicators are not used. Instead, various syntactic elements of the MPEG transport stream are chosen in each segment such that an impression of continuity is achieved when segments of different bit rates are concatenated. This can be done by using identical packed IDs (PIDs) for audio/video/per, etc., using identical audio bit rate and framing, flushing audio (outputting complete audio frames for partial frames already outputted) at GOP boundaries that demarcate the segments, and/or padding the video elementary stream with filler data so that the continuity counters of transport packets match across bit rates. The video elementary data is padded so that the number of transport packets with video in each segment is divisible by 16 (as packet continuity counters roll over on 16). When video conforms to the H.264 standard, for example, a variety of fillers can be used such as zero byte padding between frames or network abstraction layer (NAL) units.

As shown in FIG. 2B, corresponding segments of different data files 101-103 have different data sizes. Specifically, Seg_1C is larger than Seg_1B which is larger than Seg_1A. Thus, it may take longer to transmit Seg_1B than Seg_1A to the receiving device (e.g., depending on the connection bandwidth of the receiving device), and it may take even longer to transmit Seg_1C than either of Seg_1B or Seg_1A to the receiving device.

By pre-encoding each of the data files 101-103 at a different bit rate, a content provider may individually transmit (or the receiving device may selectively retrieve) each of the n segments pertaining to the media content 130 from a selected one of the data files 101-103. For example, the content provider may first transmit Seg_1A to the receiving device, upon determining that the receiving device initially has a relatively low bandwidth, and subsequently transmit Seg_2B or Seg_2C to the receiving device after detecting an increase in bandwidth available to the receiving device. In this manner, the sound and/or video playback quality of the media content 130 may be optimized to utilize the available bandwidth of the receiving device.

Figure 3:
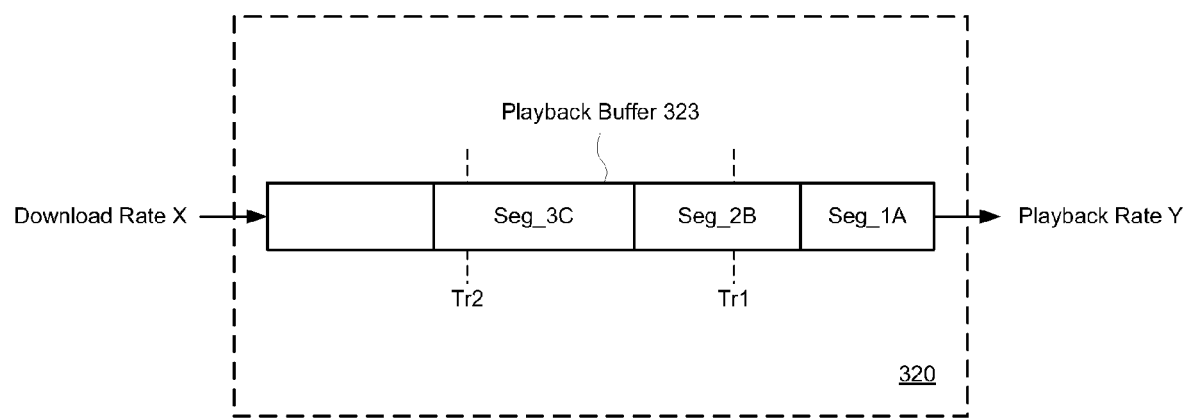
FIG. 3 illustrates a playback buffer for use in determining at which bit rate to retrieve segments of media content.

FIG. 3 illustrates a playback buffer 323 for use in determining at which bit rate to retrieve segments of media content. The playback buffer 323 is included as part of a playback device 320 that is capable of retrieving media content from a network and playing back (e.g., displaying or rendering) the media content to a user. Media content segments received by the playback device 320 are subsequently loaded into the playback buffer 323 and queued for playback.

Data pertaining to the media content (e.g., media content segments) is retrieved into the playback buffer 323 at a download rate X, which may vary depending on network bandwidth conditions. On the other hand, media content segments already stored in the playback buffer 323 are consumed or processed by the playback device 320 based on a playback rate Y. The playback rate Y of the media content may be relatively constant or fixed (e.g., at 30 frames per second), and thus has very little or no correlation with the download rate X.

For some embodiments, the playback device 320 monitors the storage capacity (or "fullness") of the playback buffer 323 in order to gauge the amount of available bandwidth for downloading media content segments from the network. For example, if the storage level within the playback buffer 323 drops below a first threshold Tr1 (e.g., the number of stored media content segments available for playback are about to run out), it may be indicative that the available bandwidth for the playback device 320 is too low to be retrieving media content segments at the current bit rate. In response, the playback device 320 may proceed by retrieving subsequent media content segments at a lower bit rate (e.g., BR_A).

If the storage level within the playback buffer 323 is greater than (or equal to) the first threshold Tr1 and less than a second threshold Tr2 (e.g., there is an adequate number of media content segments to last a given duration of playback), it may be indicative that the available bandwidth is more than adequate for retrieving media content segments at the current bit rate. In response, the playback device 320 may proceed by retrieving subsequent media content segments at a slightly higher bit rate (e.g., BR_B).

If the storage level within the playback buffer 323 exceeds the second threshold Tr2 (e.g., there is a significant number of media content segments to last a relatively lengthy duration of playback), the playback device 320 may similarly proceed by retrieving subsequent media content segments at an even higher bit rate (e.g., BR_C). Because the playback rate Y is substantially constant, for some embodiments, the playback device 320 may be configured to check the fullness of the playback buffer 323 at regular intervals (e.g., after every 30 seconds etc. . . . ). Alternatively, the playback device 320 may be configured to check the fullness of the playback buffer 323 at one or more programmatically determined intervals.

It should be noted that, although the playback rate Y may be fixed, the rate of data consumption within the playback buffer 323 may vary depending on the bit rate(s) of the stored media content segments. For example, referring back to FIGS. 2A and 2B, both of the media content segments Seg_1A and Seg_1C correspond to the same duration of playback (i.e., from $T_0$ to $T_1$), however, Seg_1C is clearly larger in terms of data size than Seg_1A. Thus, the data consumption rate for playing back Seg_1C would be much larger than the data consumption rate for playing back Seg_1A.

For alternative embodiments, the playback device 320 may monitor the number of media content segments stored in the playback buffer 323 in order to determine at which bit rate to retrieve subsequent media content segments. For example, the playback device 320 may retrieve media content segments at a lower bit rate if the number of media content segments is below a given threshold. Similarly, the playback device 320 may retrieve subsequent segments at progressively higher bit rates as the number of stored media content segments exceeds one or more thresholds.

For some embodiments, an initial one or more segments pertaining to the media content 130 are retrieved at the lowest bit rate (e.g., BR_A). For example, the playback buffer 323 is typically empty (e.g., the storage capacity<Tr1) when the playback device 320 first sends a request for the media content 130, regardless of whether the fullness of the buffer 323 is measured in terms of data size or number of stored segments. The playback device 320 may therefore automatically (or programmatically) request media content segments encoded at the lowest bit rate upon checking the initial fullness of the playback buffer 323.

It should be noted that in the exemplary embodiments herein, two thresholds (e.g., Tr1 and Tr2) are used to determine the fullness of the playback buffer 323. However, the actual number of thresholds used for detecting buffer fullness may be greater than or fewer than those shown. For example, more or fewer thresholds may be used to detect the fullness of the playback buffer 323 if the corresponding media content 130 is encoded at more of fewer bit rates, respectively.

The playback buffer 323 therefore serves two functions, by buffering (or storing) the received media content segments for playback as well as providing a means for the playback device 320 to determine at which bit rate(s) to retrieve subsequent media content segments from the network.

Figure 4:
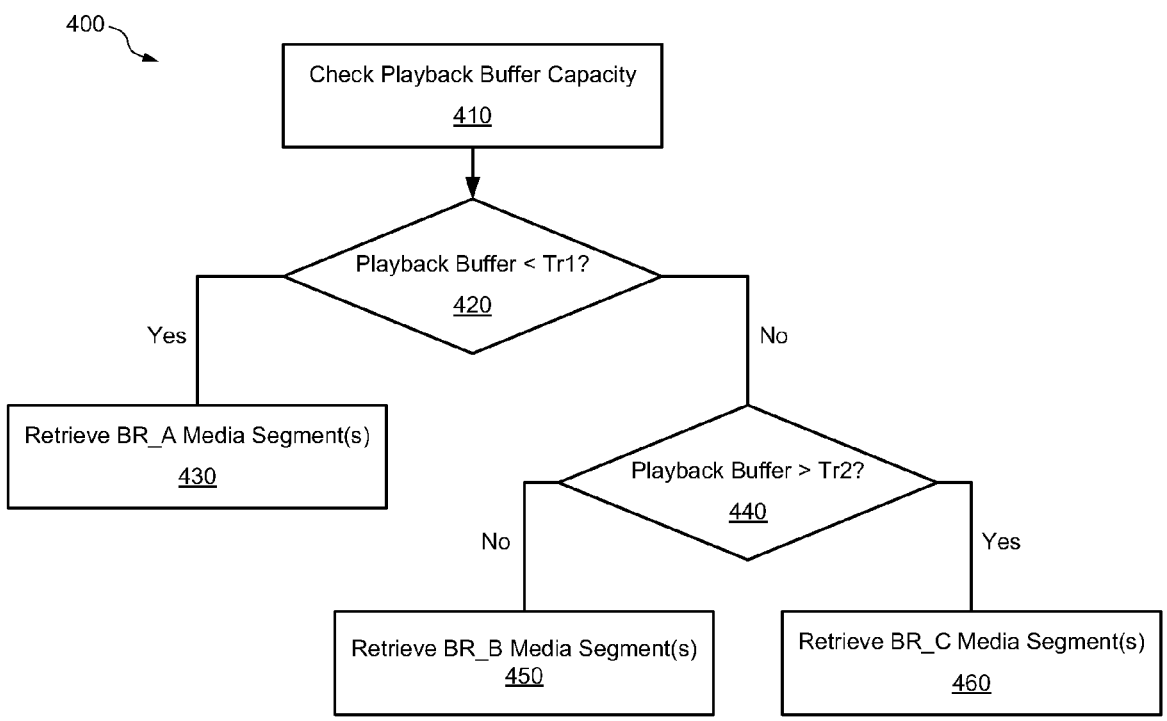
FIG. 4 illustrates a method for determining at which bit rate to retrieve segments of media content.

FIG. 4 illustrates a method for determining at which bit rate to retrieve segments of media content. The process begins at 410 by checking the storage capacity of a playback buffer in which received media content segments are stored and queued for playback. For some embodiments, the fullness of the playback buffer is measured based on the raw data size of its contents. Alternatively, the fullness of the playback buffer may be measured based on the number of media content segments stored therein.

At 420, a determination is made as to whether the storage capacity of the playback buffer is less than a first threshold amount (Tr1). If it is determined that the fullness of the playback buffer (e.g., based on data size or number of segments) is less than the first threshold (i.e., storage capacity<Tr1), media content segments are subsequently retrieved at the lowest bit rate (e.g., BR_A), at 430.

If it is determined that the fullness of the playback buffer is at least equal to or greater than the first threshold amount (i.e., storage capacity≥Tr1), a subsequent determination is then made, at 440, as to whether the storage capacity of the playback buffer is greater than a second threshold amount (Tr1). If it is then determined that the fullness of the playback buffer is less than or equal to the second threshold amount (i.e., storage capacity Tr2), then the subsequent media content segments are retrieved at the middle bit rate (e.g., BR_B), at 450.

Finally, if it is determined that the fullness of the playback buffer is greater than the second threshold amount (i.e., storage capacity>Tr2), then the subsequent media content segments are retrieved at the highest bit rate (e.g., BR_C), at 460. The process 400 may then be repeated any number of times (e.g., at regular intervals) until all of the segments pertaining to the given media content are retrieved.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

For example, if a user desires to skip (or "jump") to a certain point in the media content, the playback device may immediately retrieve the appropriate media content segments at the lowest bit rate to enable instant (or near-instant) playback of the media content beginning at the point of interest. After a user requests to skip to a certain point in the media content, the playback buffer may then be emptied (e.g., by discarding any data currently stored therein) causing a detected fullness of the buffer to drop below a lowest threshold. The playback device may therefore automatically (or programmatically) request media content segments encoded at the lowest bit rate upon checking the fullness of the playback buffer at the time the skip request is made.

Further, it should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media).

What is claimed is:

1. A method performed by one or more processors for providing media content over a network, the method comprising:
   partitioning the media content into an ordered sequence of media segments;
   encoding each of the media segments (i) at a first bit rate to generate a respective one of a first set of data segments and (ii) at a second bit rate to generate a respective one of a second set of data segments, wherein:
   the first bit rate is lower than the second bit rate; and
   data segments of the first set of data segments may be used interchangeably with data segments of the second set of data segments to facilitate continuous playback of the media content;
   receiving a request for the media content from a first device coupled to the network;
   transmitting at least one of the first set of data segments for one or more initial ones of the media segments encoded at the first bit rate, wherein at least some of the data segments of the first set of data segments transmitted are stored in a data buffer on the first device and queued for playback according to their respective order in the ordered sequence;
   receiving, from the first device, a playback buffer capacity value corresponding to the data buffer on the first device; and selectively transmitting the respective one of the first set of data segments or the second set of data segments based on an available storage space of the data buffer, for each subsequent media segment following the one or more initial ones of the media segments, wherein:

transmitting a data segment from the first set of data segments is selected if the playback buffer capacity value is below a first threshold amount during a first transmission time;

transmitting a data segment from the second set of data segments is selected if the playback buffer capacity value is at least equal to the first threshold amount during the first transmission time; and the playback buffer capacity value indicates an amount of stored media content segments of the media segments available for playback.

2. The method of claim 1, wherein selectively transmitting the respective one of the first set of data segments or the second set of data segments comprises transmitting the respective one of the first set of data segments or the second set of data segments based on the respective order of the respective media segments in the ordered sequence, to enable continuous playback of the media content.

3. The method of claim 1, wherein receiving the request for the media content comprises receiving one or more requests for each respective one of the first set of data segments or the second set of data segments.

4. The method of claim 1, wherein selectively transmitting the respective one of the first set of data segments or the second set of data segments comprises transmitting, from the first set of data segments, a first data segment corresponding with a first media segment of the media segments in the ordered sequence to enable the first device to begin playback of the media content using the first data segment.

5. The method of claim 1, further comprising encoding each of the media segments at a third bit rate to generate a respective one of a third set of data segments, wherein data segments of the third set of data segments may be used interchangeably with the data segments of the first or second sets of data segments to facilitate continuous playback of the media content.

6. The method of claim 5, wherein the third bit rate is greater than either of the first and second bit rates.

7. The method of claim 6, wherein selectively transmitting the respective one of the first set of data segments or the second set of data segments further comprises:

transmitting a data segment from the third set of data segments is selected if the playback buffer capacity value is at least equal to a second threshold amount during a second transmission time.

8. The method of claim 1 wherein:

selectively transmitting the respective one of the first set of data segments or the second set of data segments comprises transmitting the data segments of the first and second sets of data segments based on an order of the respective media segments in the ordered sequence, to enable continuous playback of the media content; and receiving the request for the media content comprises receiving one or more requests for each respective one of the first set of data segments or the second set of data segments.

9. The method of claim 1 further comprising:

encoding a subset of the media segments at a third bit rate to generate a respective one of a third set of data segments, wherein data segments of the third set may be used interchangeably with the data segments of the first or second sets of data segments to facilitate continuous playback of the media content; wherein:

selectively transmitting the respective one of the first set of data segments or the second set of data segments comprises transmitting, from the first set of data segments, a first data segment corresponding with a first media segment of the media segments in the ordered sequence to enable the first device to begin playback of the media content using the first data segment.

10. A method performed by one or more processors for retrieving media content over a network, the method comprising:

transmitting a request for the media content to a first device coupled to the network, wherein the media content is partitioned into an ordered sequence of media segments;

retrieving, from the first device, a plurality of data segments pertaining to the media segments, respectively;

storing the data segments at a playback buffer;

queueing the plurality of data segments for playback according to their respective order in the ordered sequence;

detecting a playback buffer capacity value after retrieving an initial data segment of the plurality of data segments corresponding to an initial media segment of the media segments, wherein:

each subsequent data segment of the plruliaty of data segments following the initial data segment and corresponding to a subsequent media segment of the media segments is encoded at one of a first bit rate or a second bit rate;

the first bit rate is lower than the second bit rate; and all of the media segments are substantially identical in length to each other;

transmitting the plurality of data segments based on an available storage space of the playback buffer;

transmitting a request for a subsequent data segment of the plurality of data segments encoded at the first bit rate if the playback buffer capacity value is below a first threshold amount; and transmitting a request for a subsequent data segment of the plurality of data segments encoded at the second bit rate if the playback buffer capacity value is at least equal to the first threshold amount;

wherein data segments encoded at the first bit rate cct may be used interchangeably with data segments encoded at the second bit rate to facilitate continuous playback of the media content; and the playback buffer capacity value indicates an amount of stored media content segments of the media segments available for playback.

11. The method of claim 10, wherein retrieving the plurality of data segments comprises retrieving the plurality of data segments based on an order of the respective media segments in the ordered sequence, to enable continuous playback of the media content.

12. The method of claim 10, wherein transmitting the request for the media content comprises transmitting one or more requests.

13. The method of claim 10, further comprising analyzing a media content in a preliminary pass using scene cut detection heuristics.

14. The method of claim 10, wherein all of the media segments are substantially identical in length to each other.

15. The method of claim 10, wherein the initial data segment corresponding to the initial media segment is encoded at the first bit rate.

16. The method of claim 10 wherein:
at least some of the plurality of data segments following the initial data segment and corresponding to a subsequent media segment of the media segments are encoded at a third bit rate; and
the third bit rate is higher than either the first bit rate or the second bit rate.

17. The method of claim 10, wherein:
all of the media segments are substantially identical in length to each other; and
the initial data segment corresponding to the initial media segment is encoded at the first bit rate.

18. The method of claim 10, wherein:
retrieving the plurality of data segments comprises retrieving the plurality of data segments based on an order of the respective media segments in the ordered sequence, to enable continuous playback of the media content; and
transmitting the request for the media content comprises transmitting one or more requests.

* * * * *